(12) United States Patent
Zapp

(10) Patent No.: US 6,491,030 B2
(45) Date of Patent: Dec. 10, 2002

(54) VENTILATION DEVICE FOR A FUEL TANK

(75) Inventor: Thomas Zapp, Dortmund (DE)

(73) Assignee: Mannesmann VDO AG, Frankfurt (DE)

( * ) Notice: Subject to any disclaimer, the term of this patent is extended or adjusted under 35 U.S.C. 154(b) by 0 days.

(21) Appl. No.: 09/813,705

(22) Filed: Mar. 21, 2001

(65) Prior Publication Data

US 2002/0023923 A1 Feb. 28, 2002

(30) Foreign Application Priority Data

Mar. 21, 2000 (DE) .......................................... 100 13 919

(51) Int. Cl.$^7$ ............................................... F02M 37/04
(52) U.S. Cl. ...................................... 123/516; 137/588
(58) Field of Search ................................ 137/588, 587; 123/516

(56) References Cited

U.S. PATENT DOCUMENTS

| | | | | |
|---|---|---|---|---|
| 3,187,936 A | * | 6/1965 | Downing | |
| 4,718,568 A | | 1/1988 | Dal Pal u | |
| 4,722,454 A | * | 2/1988 | Fischer | 137/587 |
| 5,230,360 A | * | 7/1993 | Journee et al. | 137/588 |
| 5,538,039 A | * | 7/1996 | Harde et al. | 137/592 |
| 5,704,337 A | * | 1/1998 | Stratz et al. | 123/519 |
| 5,996,622 A | * | 12/1999 | Cimminelli et al. | 137/588 |
| 6,240,958 B1 | * | 6/2001 | Streubel | 137/588 |

FOREIGN PATENT DOCUMENTS

| | | |
|---|---|---|
| DE | 4023094 C2 | 1/1991 |
| DE | 4121323 A1 | 1/1993 |
| DE | 19500775 C1 | 7/1996 |
| DE | 19524254 C1 | 1/1997 |
| FR | 2692207 A1 | 12/1993 |

\* cited by examiner

*Primary Examiner*—Thomas N. Moulis
(74) *Attorney, Agent, or Firm*—David M. Thimmig; Mayer, Brown, Rowe & Maw

(57) ABSTRACT

A ventilation device for a fuel tank, including lines situated outside the fuel tank, which include a line intended for operational ventilation and a line intended for refuelling ventilation. These lines are arranged such that the line intended for operational ventilation is located within the line for refuelling ventilation, so that the line for the operational ventilation is prevented from having direct contact with the environment. This keeps the escape of fuel vapors into the environment at a particularly low level.

11 Claims, 2 Drawing Sheets

VENTILATION DEVICE FOR A FUEL TANK

FIELD OF THE INVENTION

The invention relates to a ventilation device for a fuel tank of a motor vehicle, having lines guided out of the fuel tank including at least a line for operational ventilation and a line for refuelling ventilation.

BACKGROUND OF THE INVENTION

Ventilation devices are frequently used in fuel tanks of motor vehicles. They include lines which are each guided to a compensator reservoir provided near the filler neck of the fuel tank. These compensator reservoirs each have a connection to the environment via a common activated carbon filter. Pressure compensation of the fuel tank therefore takes place via the compensator reservoirs and via the lines during refuelling of the motor vehicle and during operation of the internal combustion engine of the motor vehicle.

A disadvantage of the known ventilation devices is that the fuel tank, including the ventilation device, has a very large surface area. A particularly large amount of fuel can pass into the environment via this very large surface area by, for example, diffusion through the walls of the lines. Furthermore, there are a plurality of connecting lines, such as, for example, refuelling ventilation and operational ventilation lines (hereinafter, collectively the "lines"), and therefore a plurality of connecting points through which fuel vapor can diffuse. This makes it impossible to obey emission legislation in many locations and/or countries.

SUMMARY OF THE INVENTION

The invention is based on the problem of designing a ventilation device so that a particularly small amount of fuel vapor escapes into the environment.

This problem is solved according to the invention by the compensator reservoirs being integrated in the tank, and by the lines having a mutually adjacent wall, at least in a subregion situated outside the fuel tank (the "subregion").

The result of this design is that in the subregion the two lines share an outer wall, and therefore an entire surface area. This reduces the total surface area of the lines and the number of connecting points. This reduction in the surface area of the lines and in the number of connecting points achieves a reduction in the permeation of fuel vapors.

According to an advantageous embodiment of the invention, the escape of fuel vapors can be further reduced if the shared outer wall of the two lines is essentially of cylindrical design. By this means, the two lines have a particularly small, shared surface area.

According to an advantageous embodiment of the invention, the escape of fuel vapors can be further reduced if the lines in the subregion are arranged with one surrounding the other.

According to another advantageous embodiment of the invention, when lines are arranged one surrounding the other, securing the inner line proves to be particularly simple if the inner line is connected to the outer line via at least one web.

According to another advantageous embodiment of the invention, the manufacturing of the lines proves to be particularly cost effective if the inner line is fastened directly to the outer line.

During refuelling, a large volume of air mixed with fuel vapors is generally conveyed out of the fuel tank. According to another advantageous embodiment of the invention, this air is better able to escape if the line for the refuelling ventilation has a larger diameter than the line for the operational ventilation.

According to another advantageous embodiment of the invention, the ventilation device requires a particularly small constructional outlay if the line for the operational ventilation opens into the line for the refuelling ventilation instead of guiding both lines to the activated carbon filter, as is done in prior art devices.

According to another advantageous embodiment of the invention, penetration of fuel from the operational ventilation line into the refuelling ventilation line can be avoided in a simple manner if the opening of the line for the operational ventilation into the line for the refuelling ventilation is arranged at a height which avoids an overflowing of fuel when the motor vehicle is in a sloping position. This arrangement of the lines also has the advantage that the fuel, which travels through the line for the operational ventilation, can return through the line for the refuelling ventilation.

According to another advantageous embodiment of the invention, an incorrect flow of fuel vapors through the lines can be avoided in a simple manner if the line for the operational ventilation can be closed by a valve. A further advantage of this design is that when the line for the operational ventilation is closed by the valve, displacement of the air in the line for the operational ventilation is avoided during the fuel tanking procedure, thus avoiding overfilling the fuel tank during this tanking procedure. The valve can be switched between the open and closed positions electromagnetically or mechanically or can be actuated by the high speed of flow in the operational ventilation or refuelling ventilation lines.

According to an advantageous embodiment of the invention, the escape of fuel vapors can be further reduced if a compensator reservoir, which is arranged in one of the lines, shares a wall with the other line or with another compensator reservoir arranged in the other line.

According to another advantageous embodiment of the invention, direct escape of the fuel vapors from the compensator reservoirs into the environment can be reliably prevented if the compensator reservoirs are arranged within the fuel tank. The connecting points of the lines to the compensator reservoirs can therefore, likewise be arranged within the fuel tank. This leads to a further reduction in the escape of fuel vapors.

The ventilation device according to the invention proves to have a particularly simple structure if the compensator reservoirs, which are arranged within the fuel tank, are arranged such that one is below the other, and if the line for the operational ventilation is guided through the compensator reservoir for the line for the refuelling ventilation. By this means, the lines can be designed with one surrounding the other as soon as they leave the compensator reservoirs. The compensator reservoirs and the lines are therefore designed as a unit which is particularly simple to handle. The lines may, for example, be screwed to the compensator reservoirs or fastened to the compensator reservoirs by welding.

The invention permits numerous embodiments. In order to further clarify its basic principle, two of these are illustrated in the drawing and are described below.

DETAILED DESCRIPTION OF THE INVENTION

Figure 1:
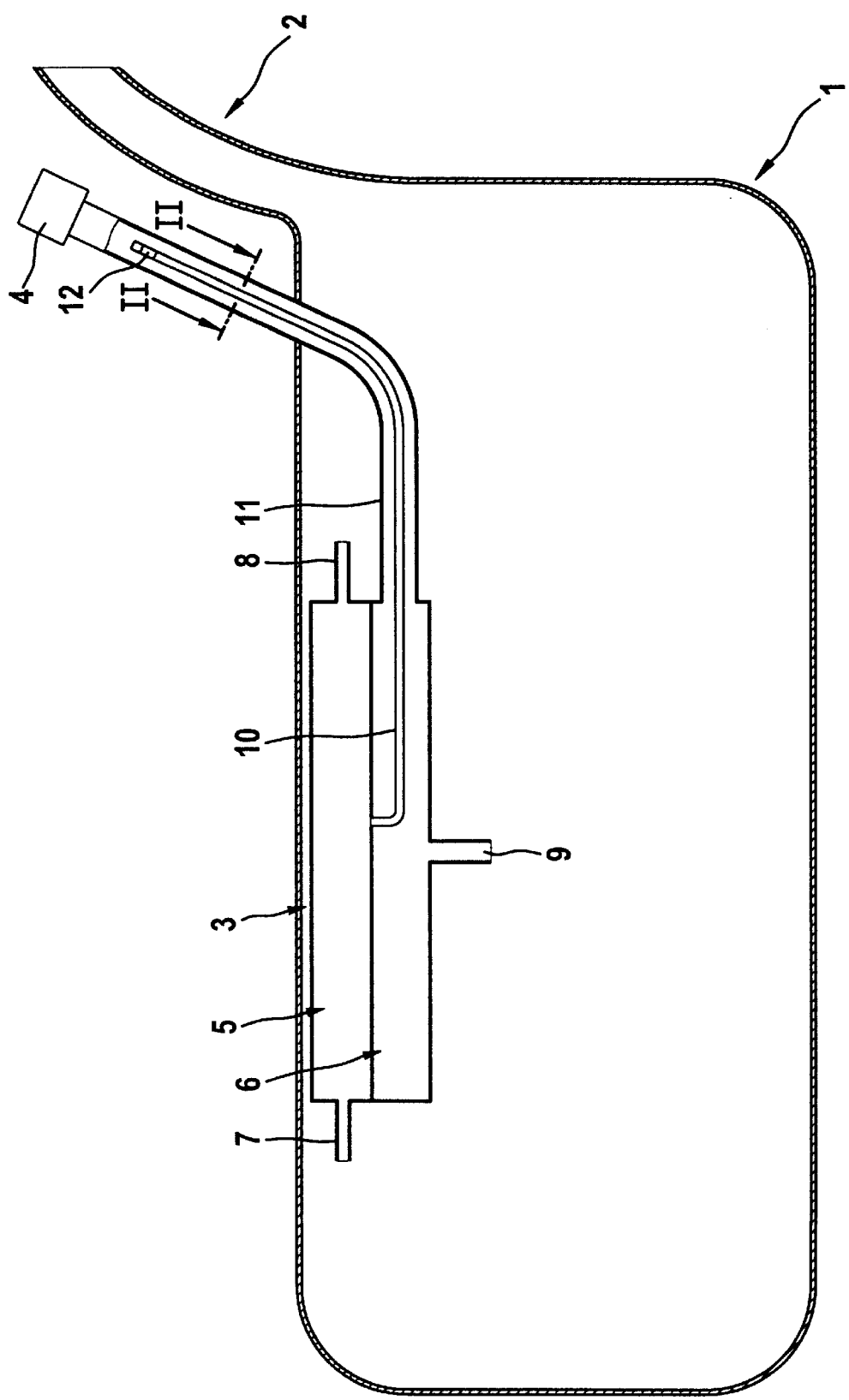
FIG. 1 Shows a cross-sectional view of a fuel tank having a ventilation device according to the invention.

FIG. 1 shows a fuel tank 1 for a motor vehicle having a filler neck 2 for pouring in fuel and having a ventilation device 3. The ventilation device 3 has an activated carbon filter 4, which is arranged outside the fuel tank 1, and a first compensator reservoir 5 and a second compensator reservoir 6, which are both fastened within the fuel tank, for operational ventilation and for refuelling ventilation, respectively. The first compensator reservoir 5 for the operational ventilation is connected above the second compensator reservoir 6 for the refuelling ventilation. The first line 7 and the second line 8, lead into the fuel tank 1. A third line 10 and a fourth line 11 lead out of the fuel tank 1. The first line 7 and the second line 8 are connected to compensator reservoir 5. The third line 10 and the fourth line 11 are connected to compensator reservoir 6. A submerged pipe 9 for restricting the filling level is also connected to compensator reservoirs 5 and 6. The fourth line 11, which leads out of the fuel tank 1, for the refuelling ventilation has a larger diameter than the third line 10 for the operational ventilation, and is guided to the activated carbon filter 4. The third line 10 for the operational ventilation is guided from the compensator reservoir 5 for the operational ventilation through the first compensator reservoir 6 for the refuelling ventilation and through a subregion of the fourth line 11, which runs, in part, outside the fuel tank 1, for the refuelling ventilation. A valve 12 is arranged in the free end of the line 10 for the operational ventilation, which end is arranged directly in front of the activated carbon filter 4. During refuelling, the valve 12 can be closed, for example mechanically, electromagnetically or by means of an air flow.

The free ends of the lines 7, 8, which are arranged within the fuel tank 1, for the operational ventilation and the submerged pipe 9 can be provided with shut-off valves (not illustrated). The shut-off valves can be used to shut off or release the first and second lines 7 and 8, respectively, and the submerged pipe 9 in accordance with the designated operating state of the motor vehicle.

Figure 2:
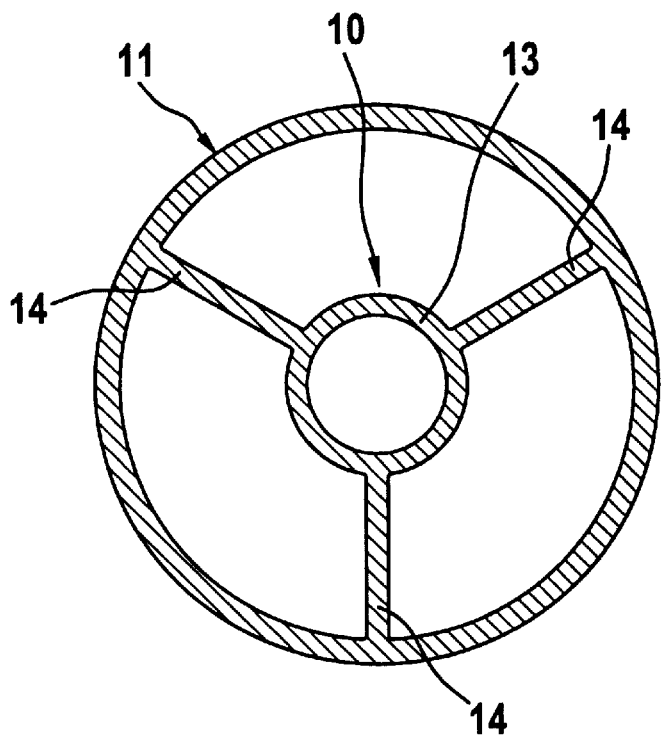
FIG. 2 Shows a cross-sectional view of the ventilation device according to the invention along the line II—II in FIG. 1.

FIG. 2 shows a cross-sectional view of the lines 10, 11, respectively, which are arranged outside the fuel tank 1 (illustrated in FIG. 1), for the operational ventilation and the refuelling ventilation. In this view, it can be seen that the fourth line 11 for the refuelling ventilation concentrically surrounds the third line 10 for the operational ventilation. The wall 13 of the third line 10 for the operational ventilation therefore separates the two lines. This wall 13 therefore does not have any contact with the environment, with the result that fuel vapors are unable to pass directly through wall 13 into the surroundings. The third line 10 for the operational ventilation is attached to the fourth line 11 of the refuelling ventilation by means of at least one web 14.

Figure 3:
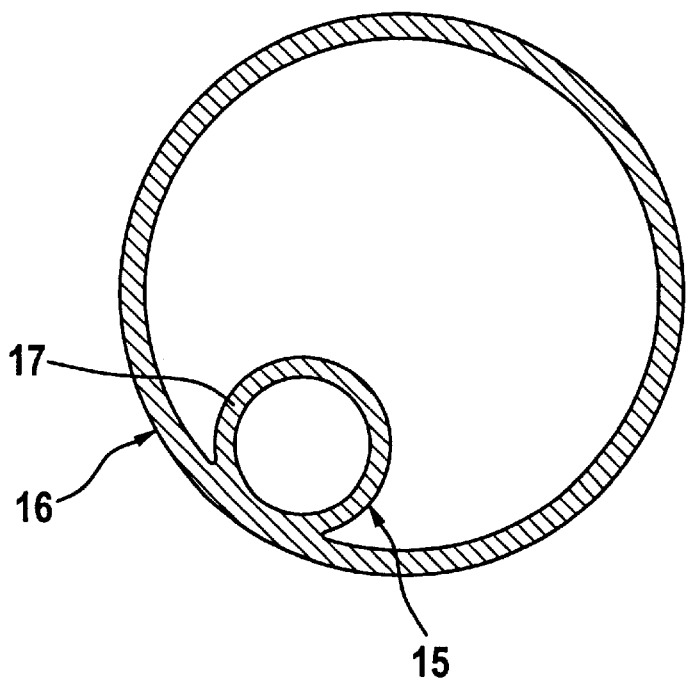
FIG. 3 Shows a cross-section view of a further embodiment of the lines.

FIG. 3 shows a further embodiment of two interconnected lines, the fifth and sixth lines, 15, 16, respectively, for the operational ventilation and the refuelling ventilation, respectively, from FIG. 1. In this case, the fifth line 15, which is small in cross section, for the operational ventilation is fastened directly to the sixth line 16 for the refuelling ventilation. In this manner, the two lines 15, 16 share a subregion of a wall 17 which does not have any contact with the environment. It is, however, also conceivable for the third line 10 as an independent line within the refuelling ventilation to be fixed only to the outlet of the line for operational ventilation

I claim:

1. A ventilation device for a fuel tank of a motor vehicle, comprising:

a subregion situated outside the fuel tank;

at least a line for refuelling ventilation;

at least a line for operational ventilation which is guided out of the fuel tank; and a wall, wherein the wall is mutually adjacent to the line for refuelling ventilation and the line for operational ventilation at least in the subregion, wherein:

the line for refuelling ventilation surrounds the line for operational ventilation, in which case the line for refuelling ventilation defines an outer line and the line for operational ventilation defines an inner line.

2. The ventilation device as claimed in claim 1, wherein the outer line is essentially of cylindrical design.

3. The ventilation device as claimed in claim 1, wherein the inner line is connected to the outer line via at least a web.

4. The ventilation device as claimed in claim 1, wherein the inner line is fastened directly to the outer line.

5. The ventilation device as claimed in claim 1, wherein the line for operational ventilation opens into the line for refuelling ventilation.

6. The ventilation device as claimed in claim 5, further comprising an opening located where the line for operational ventilation opens into the line for refuelling ventilation, wherein the opening is arranged at a height which avoids an overflowing of fuel when the motor vehicle is in a sloping position.

7. The ventilation device as claimed in claim 1, further comprising a valve, wherein the line for operational ventilation can be closed by the valve.

8. The ventilation device as claimed in claim 1, further comprising:

a compensator reservoir which is arranged in either the line for refuelling ventilation or the line for operational ventilation, respectively, and shares a wall with the line for operational ventilation, or the line for refuelling ventilation, respectively.

9. The ventilation device as claimed in claim 1, further comprising:

a first compensator reservoir which is in either the line for refuelling ventilation or the line for operational ventilation, respectively; and a second compensator reservoir which is located in either the line for operational ventilation, or the line for refuelling ventilation and shares a wall with the first compensator reservoir.

10. The ventilation device as claimed in claim 9, wherein the first and second compensator reservoirs are arranged within the fuel tank.

11. The ventilation device as claimed in claim 10, wherein the first and second compensator reservoirs are arranged one below the other, and wherein the line for operational ventilation is guided through the second compensator reservoir for refuelling ventilation.

* * * * *